US008849333B2

(12) United States Patent
Rossotto et al.

(10) Patent No.: US 8,849,333 B2
(45) Date of Patent: Sep. 30, 2014

(54) METHOD AND COMMUNICATION SYSTEM FOR PROVIDING A CONTENT DELIVERY SERVICE THROUGH PUSH-TO-TALK

(75) Inventors: Mauro Rossotto, Turin (IT); Stefano Spelta, Turin (IT); Luca Bardone, Turin (IT)

(73) Assignee: Telecom Italia S.p.A., Milan (IT)

( * ) Notice: Subject to any disclaimer, the term of this patent is extended or adjusted under 35 U.S.C. 154(b) by 718 days.

(21) Appl. No.: 12/311,912

(22) PCT Filed: Oct. 17, 2006

(86) PCT No.: PCT/EP2006/067513
§ 371 (c)(1),
(2), (4) Date: Aug. 7, 2009

(87) PCT Pub. No.: WO2008/046448
PCT Pub. Date: Apr. 24, 2008

(65) Prior Publication Data
US 2009/0325621 A1    Dec. 31, 2009

(51) Int. Cl.
*H04B 7/00* (2006.01)
*H04W 4/12* (2009.01)
*H04L 29/06* (2006.01)
*H04W 76/00* (2009.01)
*H04W 4/10* (2009.01)

(52) U.S. Cl.
CPC ............ *H04W 4/12* (2013.01); *H04L 65/1016* (2013.01); *H04W 76/005* (2013.01); *H04W 4/10* (2013.01); *H04L 65/4061* (2013.01)

USPC ........ 455/518; 455/519; 455/414.1; 455/425; 709/217; 709/218; 709/219

(58) Field of Classification Search
CPC ....... H04W 4/10; H04W 76/005; H04W 4/12; H04L 65/4061; H04L 65/1016
See application file for complete search history.

(56) References Cited

U.S. PATENT DOCUMENTS

| 2002/0028672 | A1* | 3/2002 | Qi et al. | 455/414 |
| 2006/0172753 | A1 | 8/2006 | Sung et al. | |
| 2006/0229095 | A1* | 10/2006 | Sung et al. | 455/518 |
| 2006/0271636 | A1* | 11/2006 | Balasuriya | 709/217 |
| 2007/0040892 | A1* | 2/2007 | Aoki et al. | 348/14.01 |

FOREIGN PATENT DOCUMENTS

| EP | 1 613 105 A1 | 1/2006 |
| WO | WO 2004/086715 A1 | 10/2004 |
| WO | WO 2006/002869 A1 | 1/2006 |
| WO | WO 2006/075873 A1 | 7/2006 |

* cited by examiner

*Primary Examiner* — Yuwen Pan
*Assistant Examiner* — Fanghwa Wang
(74) *Attorney, Agent, or Firm* — Finnegan, Henderson, Farabow, Garrett & Dunner, L.L.P.

(57) ABSTRACT

A method of providing a content delivery service to an actual user of a communication system supporting push-to-talk. The content delivery service includes delivering a content to the actual user, wherein the method includes associating a virtual user to said content; establishing a push-to-talk session involving the actual user and the virtual user; and delivering the content from the virtual user to the actual user through the established push-to-talk session.

17 Claims, 13 Drawing Sheets

METHOD AND COMMUNICATION SYSTEM FOR PROVIDING A CONTENT DELIVERY SERVICE THROUGH PUSH-TO-TALK

CROSS REFERENCE TO RELATED APPLICATION

This application is a national phase application based on PCT/EP2006/067513, filed Oct. 17, 2006.

TECHNICAL FIELD

The present invention relates to a method and a communication system for providing a content delivery service to users of a communication network by using a push-to-talk facility, such as the "push-to-talk over cellular" (or briefly POC) service of mobile telephone networks.

BACKGROUND ART

As known, the "push-to-talk" facility allows a group of users to be in communication one with the others through a channel. Typically, each user of the group has a terminal which is adapted to transmit and receive voice signals along the channel. Typically, each terminal is configured in a default state, wherein it can only receive voice signals from the channel. Further, each terminal is provided with a "talk button".

When a user of the group wishes to speak, he pushes the talk button of his terminal. When the talk button is pushed, the terminal switches from the default state to a further state, wherein the terminal can only transmit voice signals along the channel (talk grant). Therefore, the user can speak while keeping the talk button pushed. Voice signals generated by the user are then transmitted over the channel to all the other users of the group. These users can only listen, until the speaking user stops speaking and releases the talk button of his terminal. In other words, the channel is managed in half-duplex mode.

While the "push-to-talk" facility allows users to receive voice signals, other facilities are known for allowing a group of users of a communication network to receive other contents, e.g. video, text or a combination thereof. In the following description and in the claims, the expression "push-to-talk" (or, briefly, PTT) will refer to a facility allowing a group of users of a communication network to be connected by means of a channel managed in half-duplex mode, independently of the type of contents (voice, video, multimedia, text, data etc.) transported by the channel. Similarly, in the following description and in the claims, the expression "talk grant" will generally refer to the right of providing content of whatever form (voice, video, multimedia, text, data, etc.).

For instance, the "push-to-talk over cellular" (or briefly POC) service allows to activate and manage push-to-talk sessions between users of a mobile telephone network, which comprises e.g. a GSM network and/or a UMTS network. A telephone network supporting the POC service typically cooperates with a POC server. The POC server manages groups of users wishing to communicate through the POC service. For interacting with the POC server, terminals must be provided with a POC client and a talk button.

When a user of a group wishes to speak, he pushes the talk button of his terminal, so that his terminal sends a talk request message to the POC server. The POC server checks whether the talk grant has already been assigned to another user of the same group. In the affirmative, the POC server refuses the request by sending a talk deny message to the user. In the negative, the POC server accepts the request by sending a talk grant message to the user. When the speaking user stops speaking, he stops keeping the talk button pushed, so that his terminal sends a talk release message to the POC server. Then, the POC server can serve talk requests from other users of the group.

In the art, it is known how to use push-to-talk (PTT) for providing contents (typically audio and/or video contents) to a group of users of a communication network.

WO 2004/086715 describes a method for distributing Push-To-Talk (PTT) voice and multimedia messages to communities of subscribers. First, a PTT group of subscribers is created in an application server. Then, the subscribers register their interest in receiving PTT messages related to the created group. Finally, a content provider server sends a PTT message destined to the PTT group, the message comprising voice and/or multimedia information. The message is received by the application server, which distributes it to the registered subscribers of the PTT group using its definition of the PTT group.

EP 1613105 discloses a system providing a push-to-talk communications facility to a group of user equipment via an access network, the system comprising a push-to-talk server and an application server. The push-to-talk server includes a controller component and a media mixer component. The controller component is operable to receive and to send control messages to and from the user equipment to establish a push-to-talk communications channel. The media mixer component is operable to receive a push-to-talk message from one member of the group and to communicate the push-to-talk message to the other members of the group via the push-to-talk communications channel. The application server is operable to provide data representing content for communication to the group of user equipment. The push-to-talk server includes a data interface for receiving the content data from the application server and a control message generator, which is operable to generate control messages. The control messages establish a push-to-talk communications channel for communicating the content data from the data interface to the group of user equipment.

In the following description and in the claims, the expression "content delivery service" will indicate a service according to which a user subscribing the service and a service provider interact by exchanging contents, such as for instance audio and/or video contents. Indeed, contents are exchanged between a terminal of the user and a network apparatus of the service provider.

In the following description, the expression "push mode" will indicate a first mode according to which a service provider and a user exchange contents. According to the push mode, the service provider delivers to the user specific contents of a given type, as soon as such contents become available. Typically, content delivery is performed after the user has declared to be interested in receiving contents of that type. An exemplary service based on push mode is a service wherein a user declares to be interested in receiving real-time news relating to a predetermined event, such as news relative to goals during a football match. During the football match, in case a goal is scored, the service provider will deliver the user a piece of news relative to the goal.

Further, in the following description, the expression "pull mode" will indicate a second mode according to which a service provider and a user exchange contents. According to the pull mode, the user asks the service provider to receive a specific content. The service provider answers to the user by sending to him the specific requested content. An exemplary service based on pull mode is web browsing. When web browsing, a user requests a specific web page to a network server hosting the web page. The network server answers to the user request by sending to the user terminal data for displaying the web page.

Further, in the following description, the expression "content providing mode" will indicate a third mode according to which a service provider and a user exchange contents. According to the content providing mode, the user delivers a specific content to the service provider. Upon reception of the content, the service provider may verify content reliability and/or correctness, and then it can provide such a content to other users. An exemplary service based on content providing mode is a traffic report service wherein users can contribute to traffic reports by sending news relative to traffic to the service provider. Upon reception of a piece of news from a user, the service provider may verify its correctness and then it can insert it into a traffic report to be transmitted to other users.

SUMMARY OF THE INVENTION

The Applicant has noticed that the known solutions of content delivery via push-to-talk only provide that content be delivered to users based on push mode. In fact, according to such known solutions, content is provided to a plurality of users during a PTT session. However, the Applicant has noticed that according to the above known solutions, a user of a group can not request to be provided with specific content.

Indeed, according to known solutions, the PTT is not able to manage requests of single users wishing to receive specific content. In other words, known solutions do not support pull mode.

This disadvantageously limits the variety of content delivery services which can be supported by PTT.

Therefore, the Applicant faced a problem of providing a method, a network apparatus and a communication system for providing a content delivery service through PTT, which overcomes the aforesaid drawbacks.

In particular, the Applicant faced a problem of providing a method, a network apparatus and a communication system for providing a content delivery service through PTT, being adapted to support not only services based on push mode, but also services based on other content delivery modes, such as pull mode, so that a larger variety of content delivery services employing PTT could be developed and offered by a service provider.

According to a first aspect, it is provided a method of providing a content delivery service to an actual user of a communication system supporting push-to-talk, the content delivery service comprising delivering a content to the actual user, wherein the method comprises: associating a virtual user to the content; establishing a push-to-talk session involving the actual user and the virtual user; and delivering the content from the virtual user to the actual user through the established push-to-talk session.

In one embodiment, the associating the virtual user to the content is performed responsive to an availability of the content.

The establishing a push-to-talk session may comprise establishing a one-to-many push-to-talk session involving the virtual user and a plurality of actual users of the communication system, the plurality of actual users including the actual user.

Preferably, the method comprises requesting a talk grant for the virtual user upon associating the virtual user to the content.

The delivering of the content may be performed upon assignment of the talk grant to the virtual user.

The requesting establishment of the push-to-talk session is typically performed by the actual user.

The establishing a push-to-talk session may comprise establishing a one-to-one push-to-talk session between the actual user and the virtual user.

The method may further comprise sending at least one talk grant request from the virtual user upon establishment of the push-to-talk session, and assigning a talk grant to the virtual user. The sending at least one talk grant request from the virtual user may comprise automatically repeating sending talk grant requests until assigning the talk grant.

The delivering of the content may be performed upon assignment of the talk grant to the virtual user.

In one embodiment, the content is provided by a content provider.

As an alternative, the content is provided by a further actual user. In this case, the content may be provided through an established further push-to-talk session involving the further actual user and a further virtual user.

The method may further comprise determining whether the actual user and the virtual user are enabled to gain a talk grant during the push-to-talk session.

The actual user may not be enabled to gain a talk grant during the push-to-talk session.

The actual user may not be enabled to gain a talk grant during the push-to-talk session, in case the push-to-talk session is a one-to-many push-to-talk session.

The method may comprise storing respective display enable information associated to the actual user and to the virtual user, the display enable information indicating, respectively, whether an identifier of the actual user and an identifier of the virtual user may be displayed as available users on the push-to-talk session.

In one embodiment, the method further comprises requesting a list of available users on the push-to-talk session, and sending the list based on the display enable information.

According to a second aspect, the present invention provides a network apparatus for providing a content delivery service to an actual user of a communication system supporting push-to-talk, the content delivery service comprising delivering a content from the network apparatus to a terminal of the actual user, wherein the network apparatus comprises: a content loader module configured for associating a virtual user to the content; a service management module configured for requesting establishing of a push-to-talk session involving the actual user and the virtual user; and a transmitting module configured for delivering the content from the virtual user to the actual user.

The apparatus may comprise a first database storing information relating to a profile of the content delivery service.

The apparatus may further comprise a second database storing a list of actual user identifiers of actual users who have subscribed the content delivery service.

The apparatus may further comprise a third database storing a list of content virtual user identifiers of contents relating to the content delivery service.

The third database may further storing information for enabling appropriate association of a content virtual user identifier of the list to the content.

The apparatus may further comprises a content memory for storing the content. The content loader module may be further configured for checking availability of the content in the content memory and, upon availability of the content in the content memory, for loading the content in the third database.

The apparatus may further comprise a service management module configured for activating the content delivery service.

The apparatus may further comprise an extended group management module configured for creating at least one extended group associated to the content providing service, and for providing a push-to-talk server of the communication system with an identifier of the at least one extended group, wherein the at least one extended group comprises the actual user and the virtual user.

The apparatus may further comprise a user invitation transmission module configured for transmitting an invite message to the actual user for inviting the actual user to join a session of the content providing service.

The apparatus may further comprise a talk grant negotiation module configured for sending a talk request message to the push-to-talk server and for receiving a talk grant message or a talk deny message from the push-to-talk server.

The apparatus may further comprise a push module configured for: checking for possible new contents in the third database; and upon detection of a new content in the third database, requesting the transmitting module to transmit the new content to a plurality of actual users including the actual user.

The apparatus may further comprise a pull module configured for: upon reception of a request for a content from an actual user, requesting the talk grant negotiation module to request a talk grant; upon reception of the talk grant, requesting the transmitting module to transmit the content to the actual user.

The apparatus may further comprise a receiving module configured for receiving contents from the actual user.

The apparatus may further comprise a user-provided content memory storing the contents received from the actual user.

According to a third aspect, the present invention provides a communication system supporting push-to-talk, comprising a network apparatus as set forth above, the network apparatus being in communication with a push-to-talk server.

The communication system may further comprise a terminal of an actual user, the terminal being in communication with the network apparatus and with the push-to-talk server.

BRIEF DESCRIPTION OF THE DRAWINGS

The present invention will become more clear by the following description, given by way of example and not of limitation, to be read with reference to the accompanying drawings, wherein.

DETAILED DESCRIPTION OF PREFERRED EMBODIMENTS OF THE INVENTION

Figure 1:
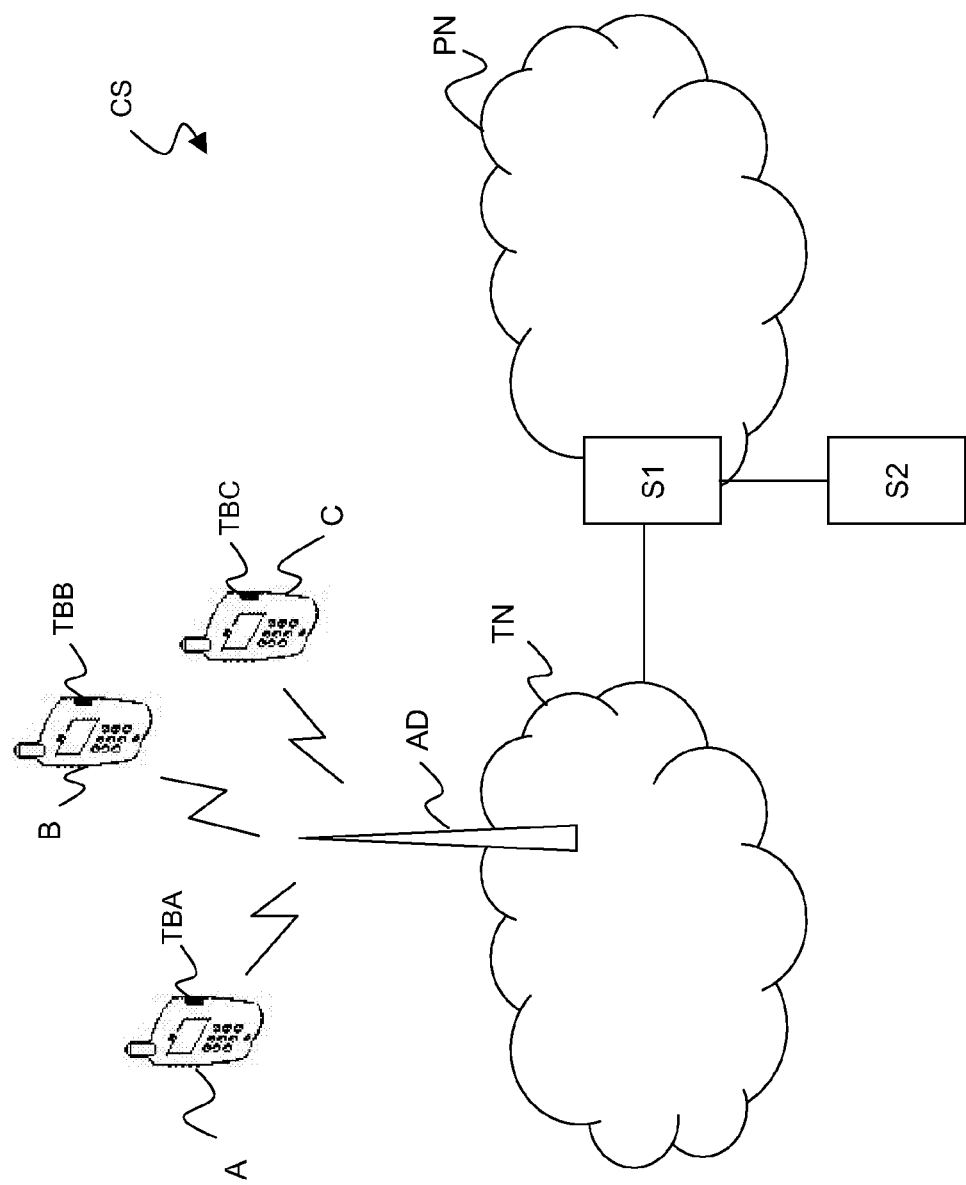
FIG. 1 schematically shows a telephone system for implementing the method according to an embodiment of the present invention.

FIG. 1 schematically shows a communication system CS for implementing the method according to an embodiment of the present invention. The communication system CS comprises a telephone network TN, for instance a mobile telephone network such as a GSM network or an UMTS network. In the following detailed description, it is assumed that the telephone network is a mobile telephone network GSM supporting OMA POC, wherein OMA stands for Open Mobile Alliance. However, the present invention may be applied also to other communication networks supporting a PTT.

The telephone network TN is connected to a packet-switched network PN, such as for instance an IP network. A plurality of terminals is connected to the telephone network TN. More particularly, by way of example, FIG. 1 only shows three terminals A, B and C. It is assumed that the three terminals A, B and C have a POC client and a button TBA, TBB, TBC playing the role of a talk button. Such a button may also be, for instance, a key (e.g. a number key) of the terminal keyboard.

Such terminals A, B and C communicate with the telephone network TN through an access device AD. For instance, in case the network TN comprises a GSM network and the terminals A, B and C are GSM terminals, such an access device AD is a Base Transceiver Station.

The packet-switched network PN comprises a POC server S1, which is adapted to manage push-to-talk sessions between users of terminals A, B and C. In particular, the POC server S1 preferably comprises a number of functionalities for managing groups. Optionally, the POC server S1 comprises additional functionalities, such as presence, authentication, charging, or the like.

The communication system CS of FIG. 1 further comprises a content server S2, which is in communication with the POC server S1. According to embodiments of the present invention, the content server S2 is adapted to manage contents to be exchanged between a service provider and a group of users subscribing a content delivery service offered by the service provider.

More particularly, for a given content delivery service, both the content server S2 and the contents to be delivered according to the service are associated to respective virtual users. In particular, a content to be delivered in pull mode or push mode is associated to a virtual user. In the following description, users of terminals A, B and C will be termed "actual users", in order to distinguish them from the virtual users.

More particularly, the content server S2 advantageously creates, for each content delivery service, an extended group on the POC server S1. Advantageously, an extended group EG associated to a given content delivery service comprises a plurality of user identifiers associated to users which are involved into the content delivery service, as it will be shown in greater detail herein after by referring to FIG. 2.

Figure 2:
FIG. 2 schematically shows an extended group (see below), according to an embodiment of the present invention.

FIG. 2 shows an exemplary extended group EG. In FIG. 2, the extended group EG is represented as a table having a number of entries, each entry comprising a respective user identifier. It is assumed that actual users of terminals A, B and C of FIG. 1 have subscribed a same content delivery service S. It is also assumed that according to such a content delivery service S a plurality of contents C1, C2, . . . , Cn may be delivered from the service provider to actual users of terminals A, B and C according to different modes, such as push mode or pull mode.

The extended group EG may comprise:

for each actual user subscribing the content delivery service S, a respective actual user identifier puA, puB and puC;

a server virtual user identifier vuS2 identifying a virtual user associated to the content server S2; and for each content C1, C2, . . . , Cn to be delivered according to the content delivery service S, a respective content virtual user identifier vuC1, vuC2, . . . , vuCn identifying the virtual user associated to the content (different from the server virtual user identifier vuS2). Content virtual user identifiers may be either statically predefined, or they may be dynamically defined according to information associated with contents arriving at the server S2, at it will be shown in further detail herein after. Therefore, a biunique relationship between a content and a virtual user is established, for each content C1, C2, . . . , Cn.

More particularly, each user identifier preferably comprises a public name of the user and a SIP address of the user.

For instance, it is assumed that a content delivery service S provides that:

a) for a given football match between team X and team Y, actual users who have subscribed the service S receive on their terminals e.g. a 20 second-long piece of the running commentary relative to a goal and/or an action which has just occurred during the match; and b) each actual user who has subscribed the service S may request to receive on his terminal 20 second-long pieces of the running commentary relative to any goal and/or any important action which has occurred during the match.

Therefore, part a) of the service S provides content delivery in push mode, while part b) of the service S provides content delivery in pull mode.

In this example, public names of the push content virtual users could be for instance:

TEAM X GOAL;
TEAM Y GOAL;
TEAM X ACTION; and
TEAM Y ACTION, and the SIP addresses of the push content virtual users could be for instance:

sip: x.goal@service-provider.com;
sip: y.goal@service-provider.com;
sip: x.action@service-provider.com; and
sip: y.action@service-provider.com.

Similarly, public names of the pull content virtual users could be for instance:

TEAM X LAST GOAL;
TEAM Y LAST GOAL;
TEAM X LAST ACTION; and
TEAM Y LAST ACTION, and the SIP addresses of the pull content virtual users could be for instance:

sip: x.last.goal@ service-provider.com;
sip: y.last.goal@ service-provider.com;
sip: x.last.action@ service-provider.com; and
sip: y.last.action@ service-provider.com.

Optionally, the service S may also provide that an actual user who has subscribed the service S and who is attending on-the-spot the match may transmit a comment about the match to the service provider through his terminal, so that such comment can be transmitted for instance in push mode or in pull mode to other actual users. In this case, the extended group preferably also comprises a further virtual user (which will be termed in the following description "basket virtual user") which is adapted to receive a content to be delivered from a user to the server S2 according to the content providing mode. The public name of the basket virtual user could be for instance:

SEND COMMENT, and the SIP address of the basket virtual user could be:

sip: send-comment@ service-provider.com.

According to preferred embodiments of the present invention, the server S2 is further adapted to associate an exchange mode label EM1, EM2, . . . , EMn to each content virtual user identifier vuC1, vuC2, . . . , vuCn comprised into the extended group EG. Each exchange mode label EM1, EM2, . . . , EMn indicates the mode(s) (i.e. push mode and/or pull mode) according to which each content C1, C2, . . . , Cn can be exchanged within the framework of the content delivery service S.

According to preferred embodiments of the present invention, the content server S2 is further adapted to associate a role to each user identifier (either actual or virtual) comprised into the extended group EG. The role of a user indicates whether the user may gain a talk grant (talk role) during a PTT session (in particular, a POC session in the example of FIG. 1) involving all the users of an extended group who accepted to join the PTT session, or not (no-talk role).

In particular, respective roles RA, RB, RC are associated to each actual user identifier puA, puB and puC. Preferably, the roles RA, RB, RC associated to each actual user identifier puA, puB and puC are no-talk roles. Besides, a role RS2 is associated to the server virtual user identifier vuS2. Preferably, the role RS2 associated to the server virtual user identifier vuS2 is a talk role. Finally, respective roles RC1, RC2, . . . , RCn are associated to each content virtual user identifier vuC1, vuC2, . . . , vuCn. Preferably, in case the exchange mode label associated to a content virtual user identifier is equal to "push mode", the respective role is a talk role. Preferably, in case the exchange mode label associated to a content virtual user identifier is equal to "pull mode", the respective role is a no-talk role. Preferably, in case the extended group also comprises basket virtual users for receiving contents which may be possibly delivered from an actual user to the server S2, the role of such virtual users is a no-talk role.

The server S2 may be further adapted to associate a display enable flag to each user identifier (either actual or virtual) comprised into the extended group EG. Such a display enable flag indicates whether a user (either actual or virtual) can be displayed or not into a list of available users participating to a POC session, which can be requested by one of the actual users.

In particular, respective display enable flags DEFA, DEFB, DEFC are associated to each actual user identifier puA, puB and puC. Preferably, the display enable flags DEFA, DEFB, DEFC associated to the actual user identifiers puA, puB and puC are "display not enabled". Besides, a display enable flag DEFS2 is associated to the server virtual user identifier vuS2. Preferably, the display enable flag DEFS2 associated to the server virtual user identifier vuS2 is "display not enabled". Finally, respective display enable flags DEFC1, DEFC2, ..., DEFCn are associated to each content virtual user identifier vuC1, vuC2, ..., vuCn. Preferably, in case the exchange mode label associated with a content virtual user identifier indicates that such a content is to be delivered only in push mode, the corresponding display enable flag is "display not enabled". On the other hand, preferably, in case the exchange mode label associated with a content virtual user identifier indicates that such a content may be delivered in pull mode, the corresponding display enable flag is "display enabled". Finally, in case the extended group also comprises basket virtual users for receiving contents which may be possibly delivered from an actual user to the server S2 according to the content providing mode, the corresponding display enable flag is preferably "display enabled".

Therefore, when an actual user (for instance the actual user of the terminal A) requests a list of available users, the displayed list will preferably include only virtual user identifiers (or, preferably, the public names) of contents to be delivered in pull mode and possible identifiers of basket virtual users.

In the following description, by referring to FIG. 3, the structure of a content server S2 according to an embodiment of the present invention will be described in detail. The modules shown in FIG. 3 can be implemented in hardware, software or a combination of hardware and software.

The content server S2 comprises a first database DB1, which comprises, for each content delivery service, information relating to the service profile, such as a service name, names of extended groups associated to the service, the mode (push, pull, or possibly content providing) according to which contents can be delivered in the framework of the service, etc.

Further, the server S2 comprises a second data base DB2, which comprises, for each content delivery service, a list of actual user identifiers of actual users which have subscribed the content delivery service.

Further, the server S2 comprises a third database DB3, which comprises, for each service, a list of content virtual user identifiers of contents C1, C2, ..., Cn relating to the content delivery service, which the server S2 has received (or will possibly receive) from a content provider CP (and/or from an actual user, in case of content providing mode). Further, for each content virtual user identifier of the list, the third database DB3 comprises information relative to the content, such as for instance the content type (audio, video, pictures, etc.). Further, for each content virtual user identifier of the list, the third database DB3 comprises information (such as metadata) for enabling appropriate association of a content virtual user identifier to a corresponding content which is stored in a further module of the server S2. The list of content virtual user identifiers may be dynamically updated each time the server S2 receives a new content from the service provider CP (or from an actual user, in case of content providing mode). Alternatively, the list of content virtual user identifiers may be predefined according to the service profile.

Further, the content server S2 comprises a service management module SM. The module SM is adapted to activate the content delivery services supported by the content server S2.

Further, the server S2 comprises a push module PushM, a pull module PullM and, optionally, a content providing module CPM, whose function will be described in further detail herein after.

The server S2 further comprises an extended group management module EGM, which is adapted to create, for each service, at least an extended group EG on the POC server S1, as already described above. Further, the module EGM is adapted to provide the POC server S1 with an identifier of the extended group comprising actual users who have subscribed the service. More particularly, the identifier of the extended group preferably comprises a public name of the group, an identifier of an owner of the extended group and a SIP address of the extended group. Since according to POC the owner of a group is the user who created the group, the owner of the group is preferably the virtual user associated to the content server S2.

Further, the server S2 may comprise a user invitation transmission module UITx. The module UITx is adapted to transmit invite messages to actual users who subscribed a given service and who are interested in a given type of contents. Such invite message invites such actual users to join a POC session relating to the subscribed service S, as it will be described in further detail herein after. Such invite messages may be transmitted for instance as SIP signaling messages, SMS messages, USSD messages or the like.

Further, the modules PushM, PullM and CPM are connected to respective talk grant negotiation modules TGN1, TGN2 and TGN3. Each module TGN1, TGN2 and TGN3 is in communication with the POC server S1 in order to send talk request messages to the POC server S1 and in order to receive talk granted messages or talk deny messages from the POC server S1. Such messages may be for instance formatted according to the known TBCP protocol ("Talk Burst Control Protocol", e.g. as specified by OMA Push to Talk Over Cellular v1.0) based on the known RTCP protocol ("Real-time Transfer Control Protocol"), or other protocols suitable for transporting talk request, talk deny, talk grant messages (i.e., for managing floor control in the PTT session).

Further, the modules PushM and PullM are connected to respective content transmission modules CTx1 and CTx2. Each module CTx1, CTx2 is in communication with the POC server S1 in order to transmit to the POC server S1 the contents C1, C2, ..., Cn to be provided to the actual users, in push mode and in pull mode, respectively. Such a content may be transmitted from S2 to S1, and then to the actual user, according to any packet-switched transmission protocol, such as for instance the RTP protocol ("Real-time Transfer Protocol").

Further, the module CPM is connected to a content reception module CRx. The module CRx is in communication with the POC server S1 in order to receive from the POC server S1 contents provided by actual users, according to the content providing mode. Such contents may be transmitted from S1 to S2 according to any packet-switched transmission protocol, such as for instance the RTP protocol ("Real-time Transfer Protocol").

Further, the module PullM is connected to a content reception request listener module CReqL, which is in turn in communication with the POC server S1. The module CReqL is adapted to listen for possible requests from actual users wishing to receive a particular content, according to the pull mode, as it will be explained in further detail herein after.

Further, the module CPM is connected to a content transmission request listener module CReqL', which is in turn in communication with the POC server S1. The module CReqL' is adapted to listen for possible requests from actual users wishing to transmit a particular content, according to the content providing mode, as it will be explained in further detail herein after.

The server S2 further may comprise a content memory CM. The content memory CM is adapted to receive and store contents C1, C2, . . . , Cn transmitted to the server S2 by a content provider CP. The server S2 further may comprise a user-provided content memory UPCM. The user-provided content memory UPCM is adapted to receive and store contents CA, CB transmitted to the server S2 by actual users, according to the content providing mode. Further, the content server S2 may be in communication with a content manager CMgr, which is adapted to check reliability and/or correctness of user-provided contents stored into the user provided content memory UPCM.

Further, the content server S2 comprises a content loader module CLo. The module CLo is adapted to check whether new contents C1, C2, . . . , Cn provided by the content provider CP are stored into the content memory CM. Further, the module CLo is adapted to check whether new contents CA, CB provided by actual users are stored into the user-provided content memory UPCM. In case the module CLo detects a new content either in the content memory CM or in the user provided content memory UPCM, the module CLo is adapted to load such a new content into the third database DB3.

In the following, it is assumed that the content delivery service S provides transmission of pieces of news relative to a given event (for instance, a football match) which will take place at a given time T of a given day. Further, it is assumed that a plurality of actual users has subscribed to such a content delivery service S, for instance through a call to a call center, an SMS, a web page, etc. Subscription will not be described in further detail, since it is not relevant to the present description.

Figure 3:
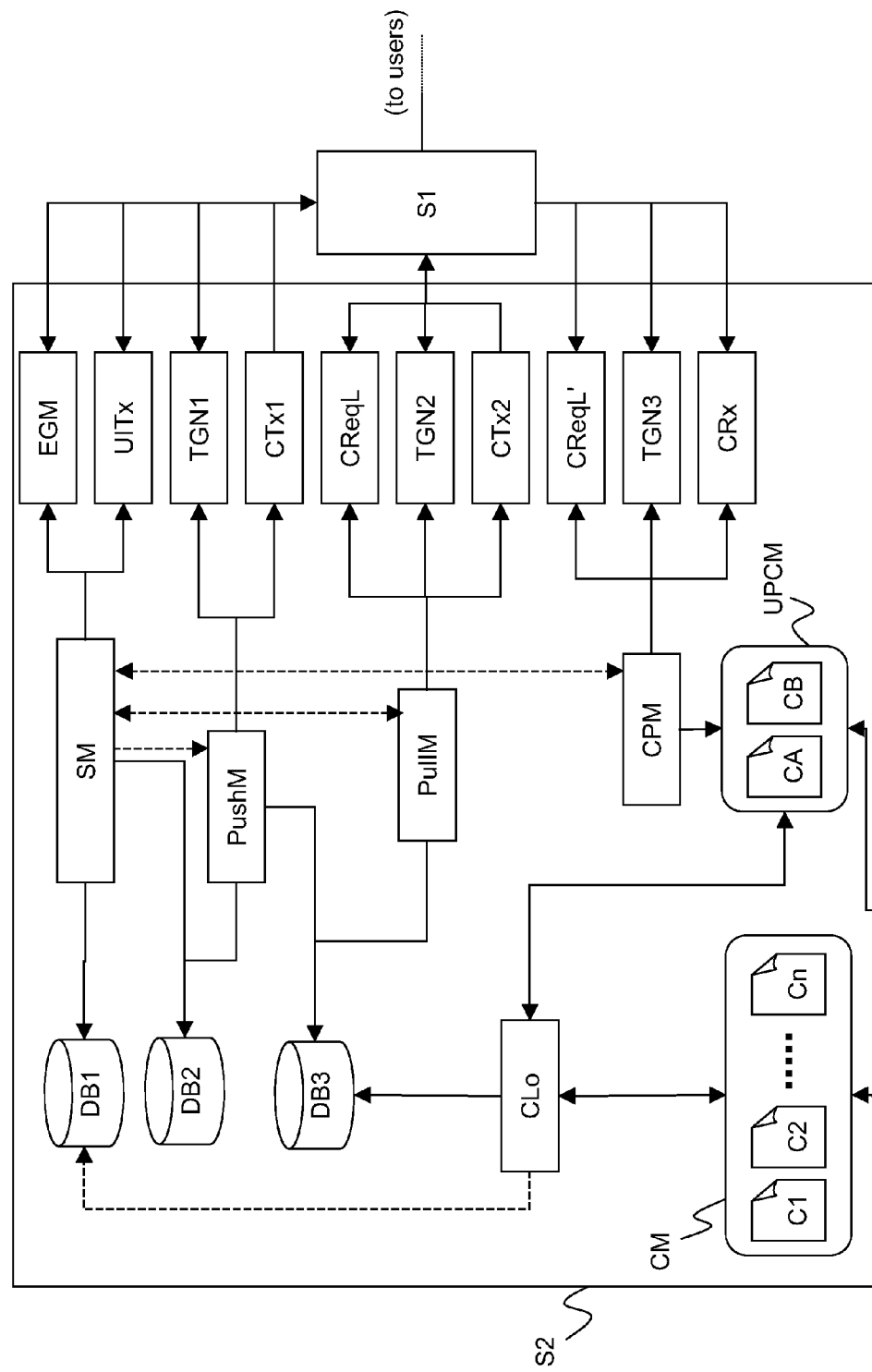
FIG. 3 schematically shows a block diagram of a content server according to an embodiment of the present invention.
Figure 4:
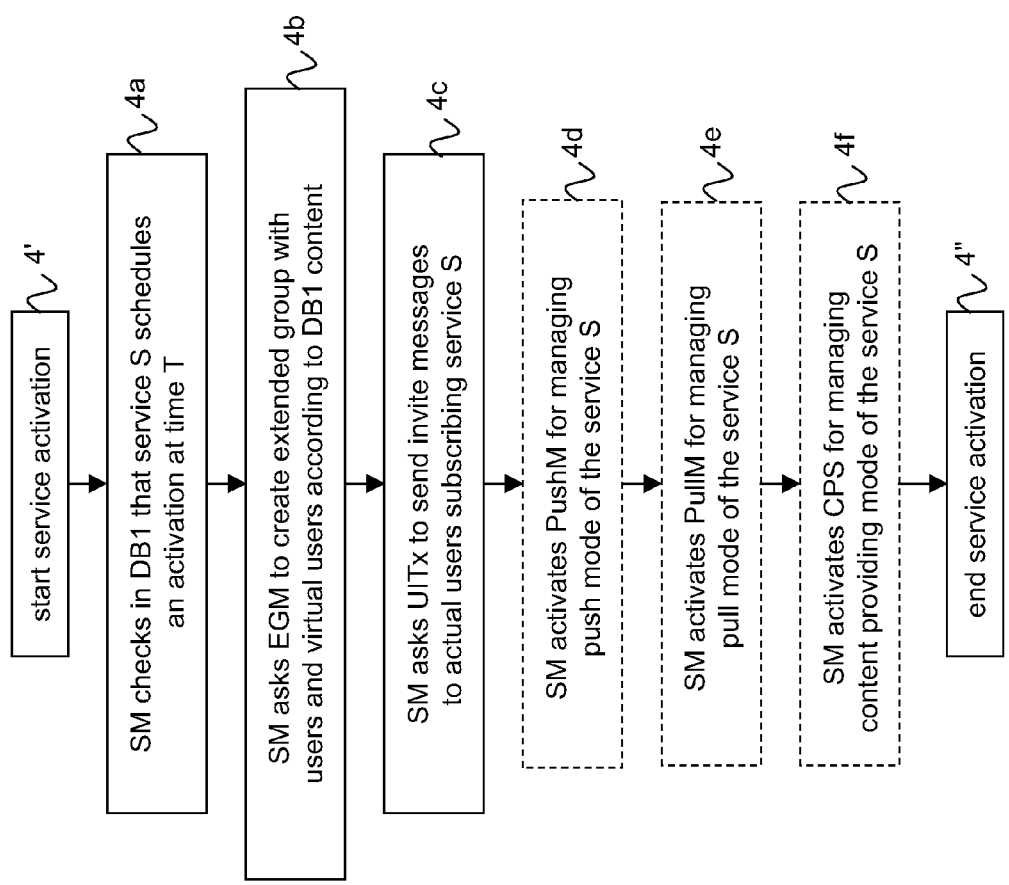
FIG. 4 is a flow chart illustrating the operation of the content server of FIG. 3 for activating a content delivery service, according to an embodiment of the present invention.

By referring to FIG. 4, the operation of the content server S2 of FIG. 3 for activating the content delivery service S, according to an embodiment of the present invention, will be now described.

For activating the service S (step 4'), the module SM, by checking the first database DB1, determines that an activation of the service S is scheduled at the time T of that given day (step 4*a*). Then, the module SM asks the module EGM to create an extended group, according to profile information about the service S stored into the first database DB1. As described above, the extended group preferably comprises the identifiers of the actual users who have subscribed to the content delivery service S, an identifier of a server virtual user associated to the content server S2 itself, and the identifiers of the content virtual users associated to the contents to be delivered according to the service S (step 4*b*). Then, the module SM asks the module UITx to transmit an invite message to each actual user which has subscribed the service S (step 4*c*). For instance, such an invite message may be implemented as an SMS message, or as a SIP INVITE message, for inviting the actual user to join the PTT session relative to the service S, as it will be shown in detail herein after by referring to FIGS. 9*a* and 9*b*. Then, in case the service S provides content delivery in push mode, the module SM activates the module PushM (step 4*d*). Similarly, in case the service S provides content delivery in pull mode, the module SM activates the module PullM (step 4*e*). Similarly, in case the service S provides content delivery in content providing mode, the module SM activates the module CPS (step 4*f*). Then, the activation of the service S is ended (step 4").

By referring to FIG. 5, the operation of the content server S2 of FIG. 3 for delivering contents in push mode, according to an embodiment of the present invention, will now be described.

Figure 5:
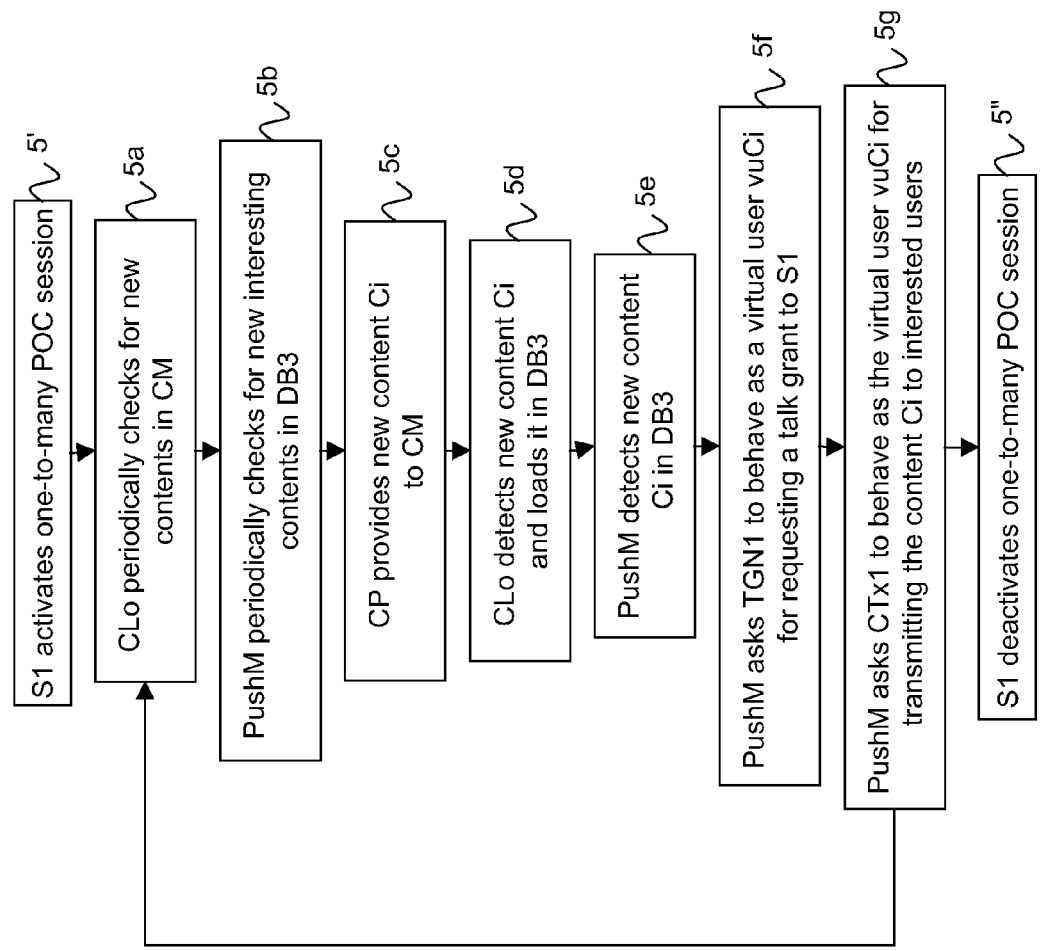
FIG. 5 is a flow chart illustrating the operation of the content server of FIG. 3 for delivering contents in push mode, according to an embodiment of the present invention.

As shown in FIG. 5, in case the service S provides content delivery in push mode, the POC server S1 firstly activates a one-to-many POC session involving all the users (both actual and virtual) belonging to the extended group of the service S (step 5'). Then, the module CLo periodically checks the content memory CM for possible new contents (step 5*a*). Further, the module PushM periodically checks the third database DB3 for possible new contents to be provided to the actual users in push mode (step 5*b*). When the content provider CP sends a new content Ci to the server S2, such a new content Ci is stored in the content memory CM (step 5*c*). At the next check, the module CLo detects the new content Ci in CM, and it loads it into the third database DB3 (step 5*d*). During step 5*d*, the new content Ci is associated to an appropriate content virtual user vuCi by the module CLo. Then, at the next check, the module PushM detects the new content Ci in DB3 (step 5*e*). Then, the module PushM asks the module TGN1 to behave as the content virtual user vuCi associated to the new content Ci, and to request a talk grant to the POC server S1 (step 5*f*). After gaining the talk grant, the module PushM asks the module CTx1 to act as the content virtual user vuCi associated to the new content Ci, by transmitting the new content Ci to all the actual users of the extended group (step 5*g*). Then, the step 5*a* is repeated, wherein the module CLo periodically checks the content memory CM for possible new contents. Finally, the POC server S1 deactivates the one-to-many POC session (step 5"). During step 5", possibly, the server S1 also eliminates the extended group of the service S.

By referring to FIG. 6, the operation of the content server S2 of FIG. 3 for delivering contents in pull mode, according to an embodiment of the present invention, will now be described.

Figure 6:
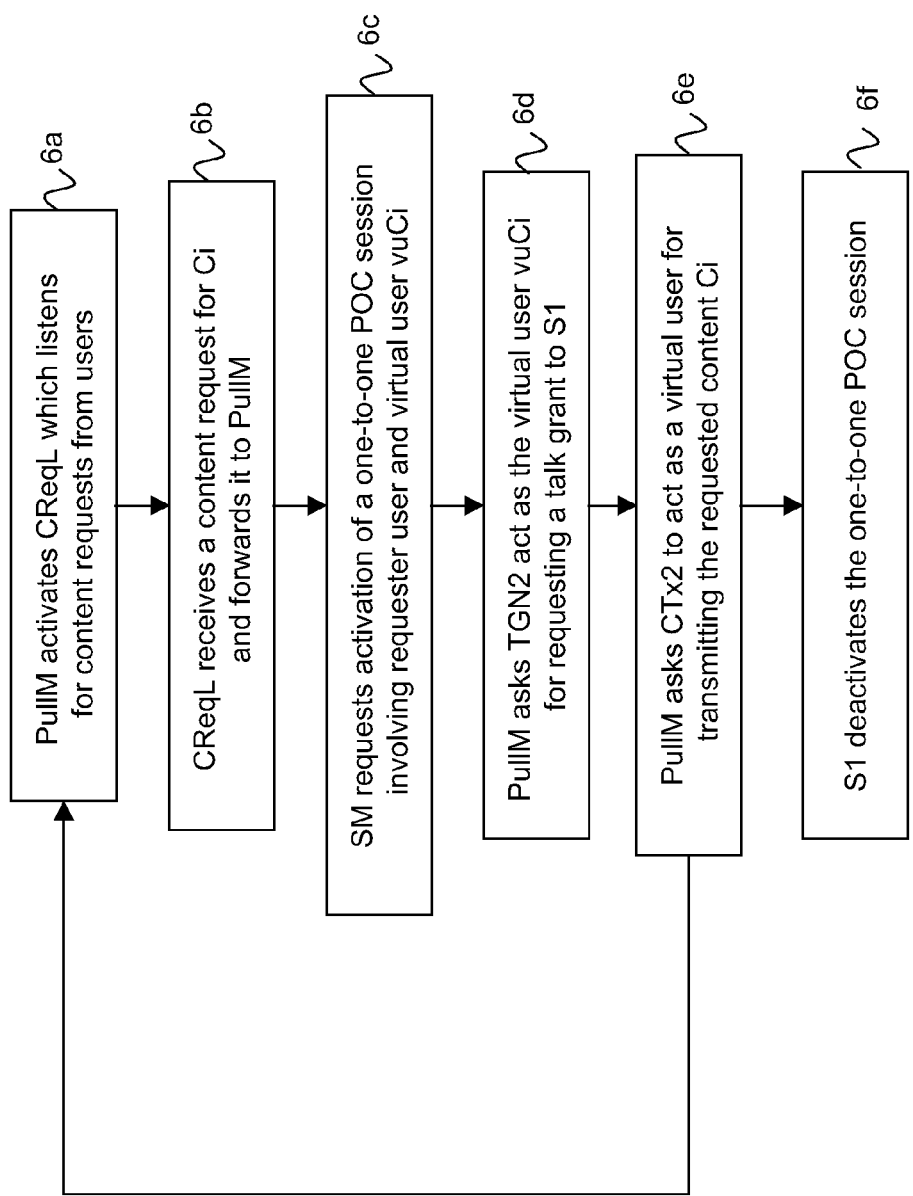
FIG. 6 is a flow chart illustrating of the operation of the content server of FIG. 3 for delivering contents in pull mode, according to an embodiment of the present invention.

As shown in FIG. 6, in case the service S provides content delivery in pull mode, the module PullM activates the module CReqL so that it listens for possible content request messages transmitted from actual users to the server S2 through the server S1 (step 6*a*). When the module CReqL receives from the POC server S1 a content request message transmitted by an actual user (step 6*b*), such a request is forwarded to the module PullM. Preferably, the content request message comprises the identifier of the content virtual user vuCi associated to the requested content Ci. Preferably, the content request message is generated by selecting a content virtual user identifier in a list of available users displayed to the actual user on his terminal according to the above described display enable flags. Upon reception of the content request message, the module SM asks the server S1 to activate a one-to-one POC session between the virtual user vuCi associated to the requested content Ci and the requesting actual user (step 6*d*). Alternatively, the one-to-one POC session may be requested by the actual user, as it will be shown in greater detail herein after. Upon establishment of the one-to-one POC session, the module PullM asks the module CTx2 to act as the virtual user vuCi associated to the requested content Ci, by requesting a talk grant to the POC server S1 (step 6*d*). After gaining the talk grant, the module PullM asks the module CTx2 to act as the virtual user vuCi associated to the requested content Ci, by transmitting the requested content Ci to the requester actual user (step 6*e*). Then, the server S1 deactivates the one-to-one POC session (step 6f). Then, the step 6a is repeated, wherein the module CReqL listens for possible content request messages.

Therefore, advantageously, the present invention allows implementing PTT-based content delivery services requiring content delivery between service provider and actual users not only in push mode, but also in pull mode. As it will be shown in detail herein after, advantageously, the present invention also allows implementing content providing services wherein in content is delivered according to other content delivery modes, such as content providing mode. In fact, independently of the content delivery mode, by associating each content to be delivered to a virtual user, each session of the service can be advantageously managed by the PTT server as a PTT session involving actual users and/or virtual users of the extended group associated to the content delivery service. Indeed, content delivery in push mode is implemented as a one-to-many PTT session between a virtual user which is enabled to talk (i.e. the virtual user adapted to transmit the content to be delivered in push mode) and a number of actual users (i.e. the actual users who subscribed to the service). Similarly, content delivery in pull mode is implemented as a one-to-one PTT session between a virtual user which is enabled to talk (i.e. the virtual user adapted to transmit the content to be delivered in pull mode) and an actual user (i.e. the actual user who has requested the content). Similarly, is it will be shown herein after by referring to FIG. 11, content delivery in content providing mode is implemented as a one-to-one PTT session between an actual user which is enabled to talk (i.e. the actual user who requested to deliver a content) and a virtual user (i.e. the virtual user adapted to receive the content to be delivered in content providing mode). Advantageously, such PTT sessions (both one-to-many and one-to-one) may be compliant to the standard POC as specified by OMA. This advantageously allows to implement the method of the invention substantially without modifying POC clients installed on terminals, and with few modifications on traditional POC servers. Indeed, for implementing preferred embodiments of the present invention, a POC server has to be able to distinguish between users with no-talk role and users with talk role. This requires few modifications of the POC server logic, as it will be described in further detail by referring to FIG. 7. Further, for implementing preferred embodiments of the present invention, a POC server has to be able to distinguish between users which can not be displayed as available users (i.e. actual users, the server virtual user and push content virtual users) and users which can be displayed as available users (i.e. pull content virtual users and possible basket virtual users). This requires few modifications of the POC server logic, as it will be described in further detail by referring to FIG. 8.

Figure 7:
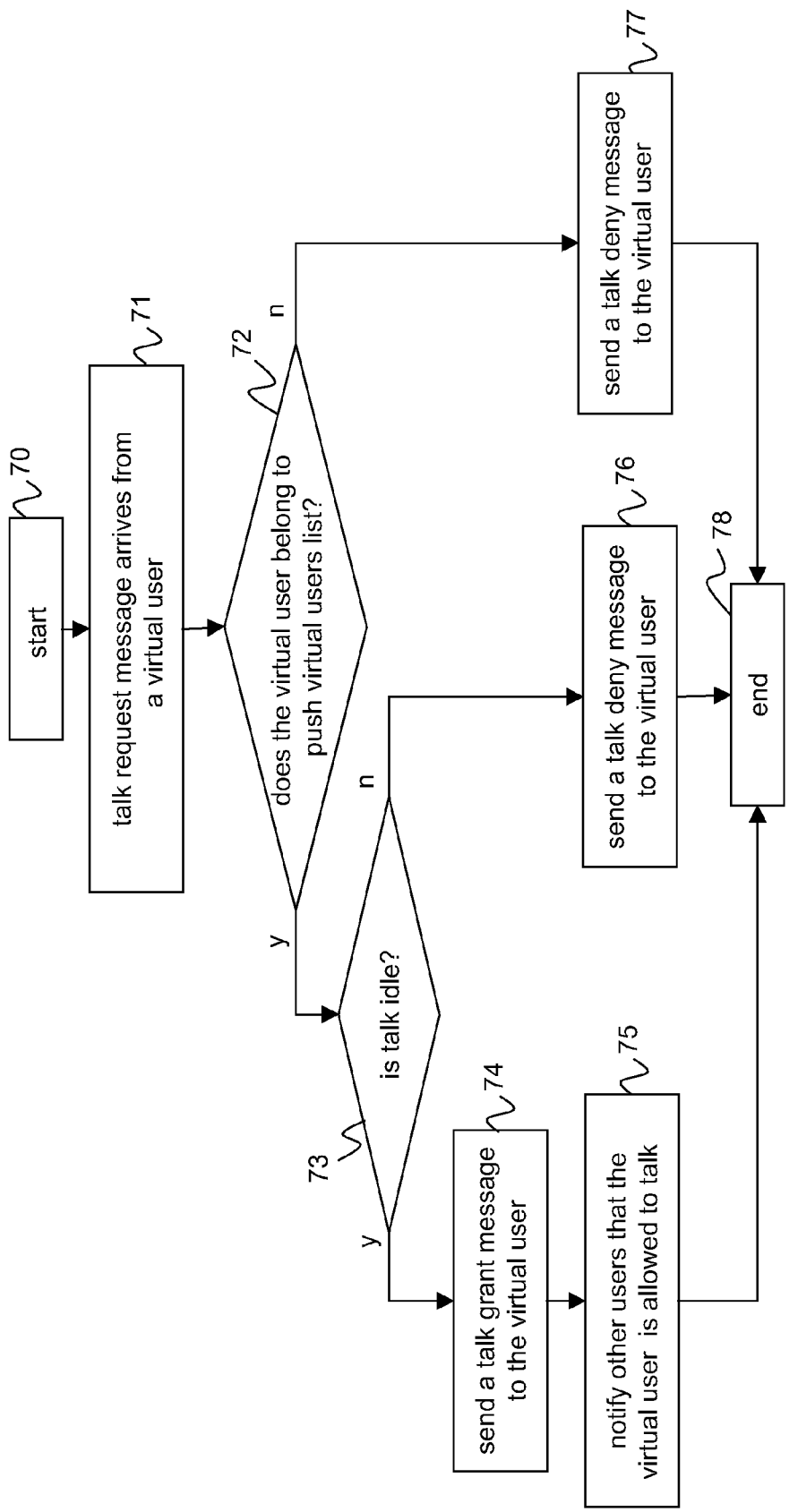
FIG. 7 is a flow chart illustrating the operation of a POC server upon reception of a talk request message from a virtual user, according to an embodiment of the present invention.

FIG. 7 is a flow chart illustrating the operation of the POC server S1 upon reception of a talk request message from a virtual user, according to an embodiment of the present invention.

When the POC server S1 receives the talk request message (step 71), it firstly checks whether the identifier of the user sending the talk request message belongs to the above mentioned list of push content virtual user identifiers (step 72). In the negative, the POC server S1 sends a talk deny message to the virtual user who sent the talk request message (step 77). In the affirmative, the POC server S1 checks whether the talk grant has already been assigned to another user of the same extended group, or if the talk grant is idle (step 73). In case the talk grant has already been assigned, the POC server S1 sends a talk deny message to the virtual user (step 74). In case the talk grant is idle, the POC server S1 sends a talk granted message to the virtual user (step 75). Then, the content Ci associated to the virtual user vuCi is delivered to the actual users.

Figure 8:
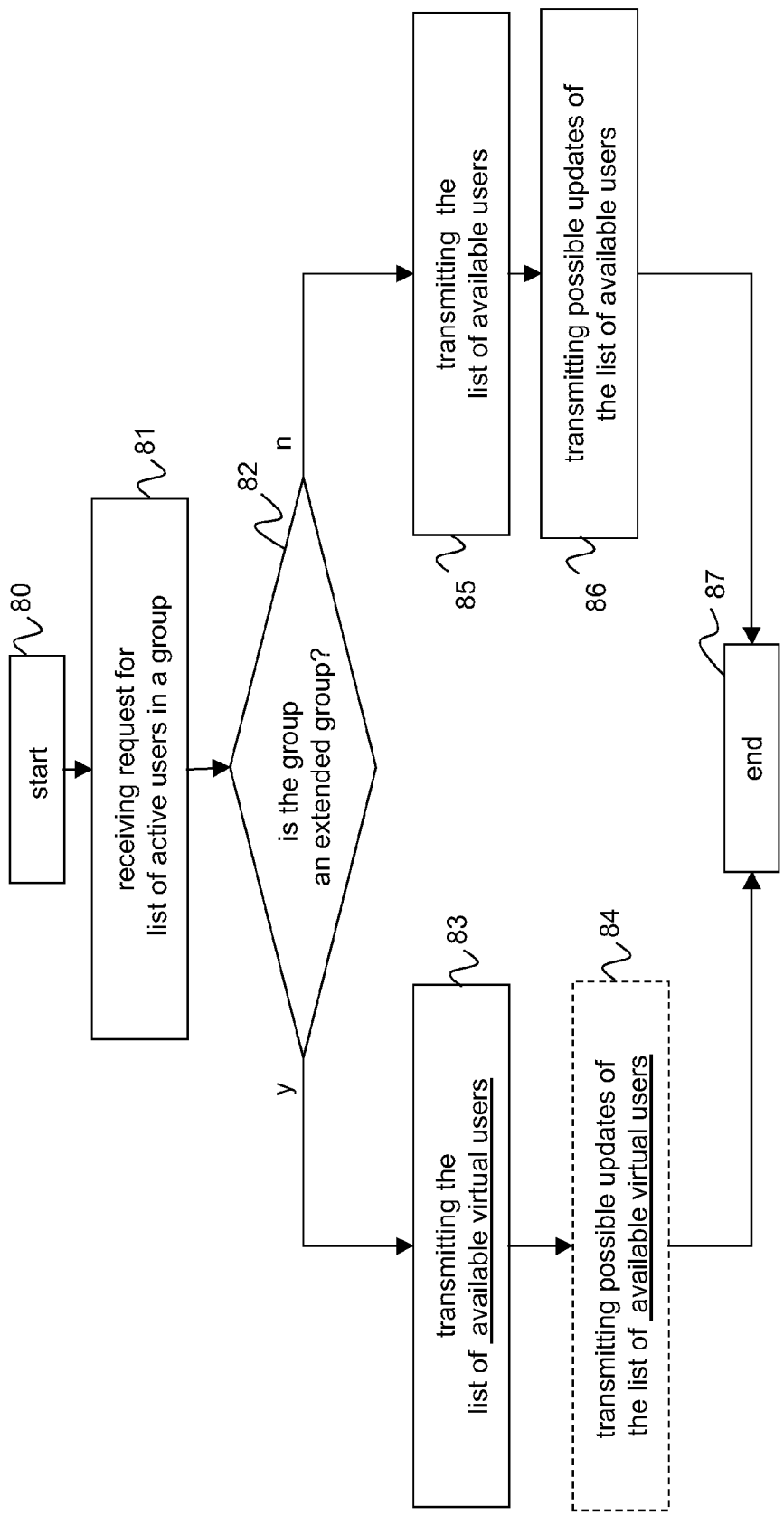
FIG. 8 is a flow chart illustrating the operation of a POC server upon reception of a request of an available user list from a user, according to an embodiment of the present invention.

FIG. 8 is a flow chart illustrating the operation of the POC server S1 upon reception of a request from an actual user wishing to receive a list of available users of his extended group, according to an embodiment of the present invention.

It is assumed that a POC server S1 receives from an actual user a request for receiving a list of available users to be displayed on his terminal (step 81). Upon reception of the request, the POC server S1 firstly checks whether the group is an extended group (step 82). In the negative, the POC server S1 behaves as a conventional POC server, by sending to the actual user a list comprising all the other actual users of the group (step 85). When a new actual user enters the group, the POC server S1 preferably sends an update of the list (step 86). In case the group is an extended group, the POC server S1 sends a list of available users which comprises only the content virtual users whose display enable flag is equal to "display enabled". In other words, only the content virtual user identifiers associated to contents to be delivered in pull mode and/or in content providing mode are comprised into the list of available users (step 83). In case a new content for being delivered in pull mode is available or a new possibility to receive a content in content providing mode is made available, the POC server preferably sends an update of the list (step 84).

Figure 9A:
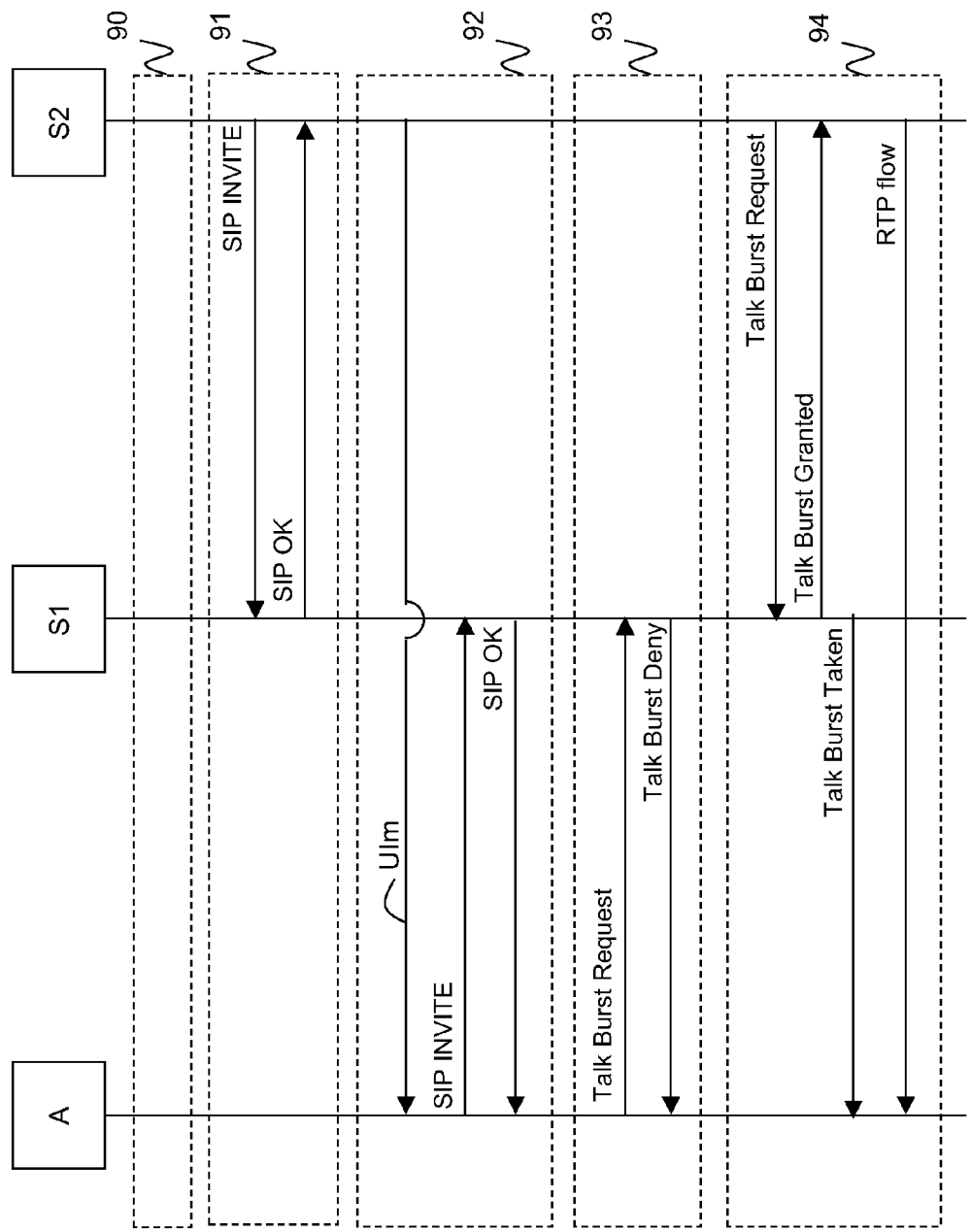
FIGS. 9a and 9b schematically show messages exchanged by a user terminal, a POC server and the content server of FIG. 3 in case of a service wherein a content is delivered in push mode, according to a first and a second embodiment of the present invention, respectively.
Figure 9B:
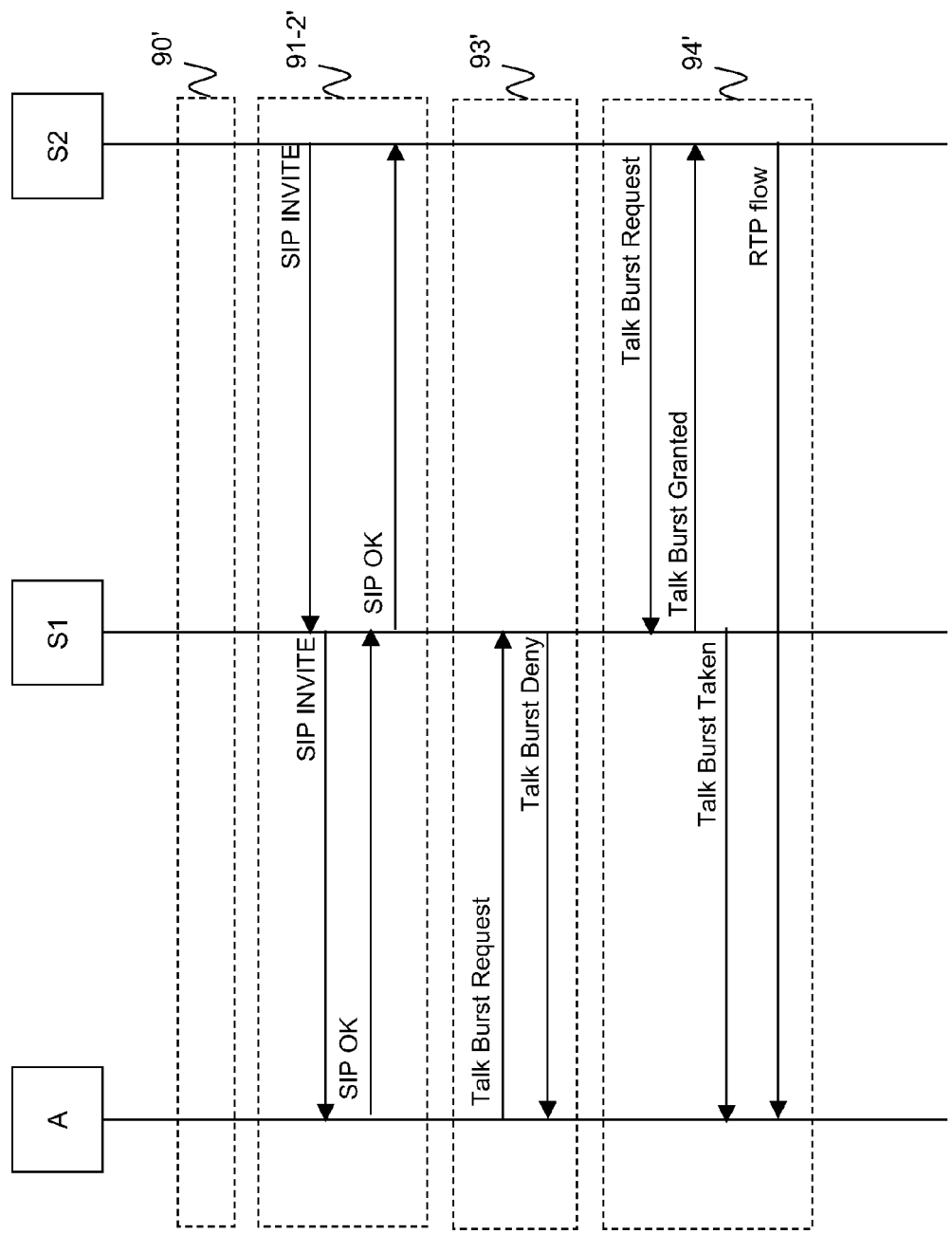

FIGS. 9a and 9b schematically show messages exchanged by a user terminal, the POC server S1 and the content server S2 of FIG. 3 in case of a service S wherein a content is delivered in push mode, according to a first and a second embodiment of the present invention, respectively. It is assumed that the POC server S1, the content server S2 and the actual users communicate through the SIP protocol. This is only exemplary, since other signaling protocols can be employed as well. Further, it is assumed that talk grants are negotiated between the POC server S1 and the users (both actual and virtual) through the above cited TBCP protocol.

By referring first to FIG. 9a, during a first step 90 the content server S2 asks the POC server S1 to create an extended group comprising all the actual users who have subscribed the service S, a server virtual user associated to the content server S2 itself, and a number of content virtual users associated to the contents to be delivered according to the service S. Then, during a step 91, for each virtual user to be inserted into the extended group, the server S2 sends a SIP INVITE message to the POC server S1. Each SIP INVITE message is adapted to ask the insertion of a given virtual user into the extended group. The POC server S1 acknowledges the reception of each SIP INVITE message and the consequent insertion of a virtual user into the extended group by sending a SIP OK message to the server S2. For clarity reason, FIG. 9a simply shows a single SIP INVITE message and a single SIP OK message.

During a second step 92, the server S2 informs all the actual users of the extended group that a session of the service S is going to be activated. Each actual user may either decide to join the session or not. More particularly, the server S2 sends to the terminal of each actual user of the extended group an information message UIm (for instance, an SMS message, a Group Advertising based on SIP messages, etc.) informing the actual user that the service S is going to be activated. The information message UIm preferably comprises the SIP address of the extended group to which the actual user has to join for enjoying the service S. For clarity reasons, FIG. 9a simply shows a single terminal A. In case the actual user of the terminal A accepts to join the extended group, the actual user sends by his terminal A a SIP INVITE message to the POC server S1, wherein he asks to join the group. Preferably, the SIP INVITE message comprises the SIP address of the group. The POC server S1 acknowledges the reception of the SIP INVITE message by sending the terminal A a SIP OK message.

The POC server S1 stores information about the role of each user (either actual or virtual) of the extended group. Therefore, the POC server S1 knows that actual users of an extended group have a no-talk role. Therefore, in case during a successive step 93 the actual user of the terminal A pushes the talk button of the terminal A, thus sending a Talk Burst Request message to the POC server S1, the POC server S1 refuses the talk request by sending a Talk Burst Deny message to the terminal A.

During a step 94, the content to be provided to the actual users of the extended group in push mode is available at the content server S2, and therefore the server S2 sends it in push mode to the actual users of the extended group. More particularly, when the server S2 detects a new content to be provided in push mode, the new content is associated to an appropriate content virtual user identifier. Further, the virtual user associated to the new content and residing on S2 sends a Talk Burst Request message to the POC server S1. Since the POC server S1 knows that content virtual users associated to contents to be delivered in push mode have a talk role, the POC server S1 sends a Talk Burst Granted message to the virtual user (not shown in FIG. 9b) associated to the new content and residing on the server S2. Further, the POC server S1 informs the terminal A that the talk grant has been assigned to the content virtual user associated to the new content, by sending a Talk Burst Taken message to the terminal A. The server S2 then may transmit the new content to the terminal A, for instance as an RTP flow.

By referring now to FIG. 9b, the first step 90' wherein the server S2 asks the POC server S1 to create the extended group is identical to the step 90 of FIG. 9a. Therefore, a detailed description thereof will not be repeated.

During a second step 91-2', differently from step 92, the server S2 invites each actual user of the extended group by sending to their terminal a SIP INVITE message through the POC server S1. Therefore, in this case, the server S2 acts as a virtual user associated to the server S2 itself, wishing to activate a one-to-many POC session with all the other actual users of the same extended group. In case the actual user accepts the invitation, the actual user sends by his terminal A a SIP OK message to the POC server S1, which then forwards it to the server S2. The extended group is then active.

Successive steps 93' and 94' are identical to the steps 93, 94 of FIG. 9a. Therefore, a detailed description thereof will not be repeated.

Figure 10A:
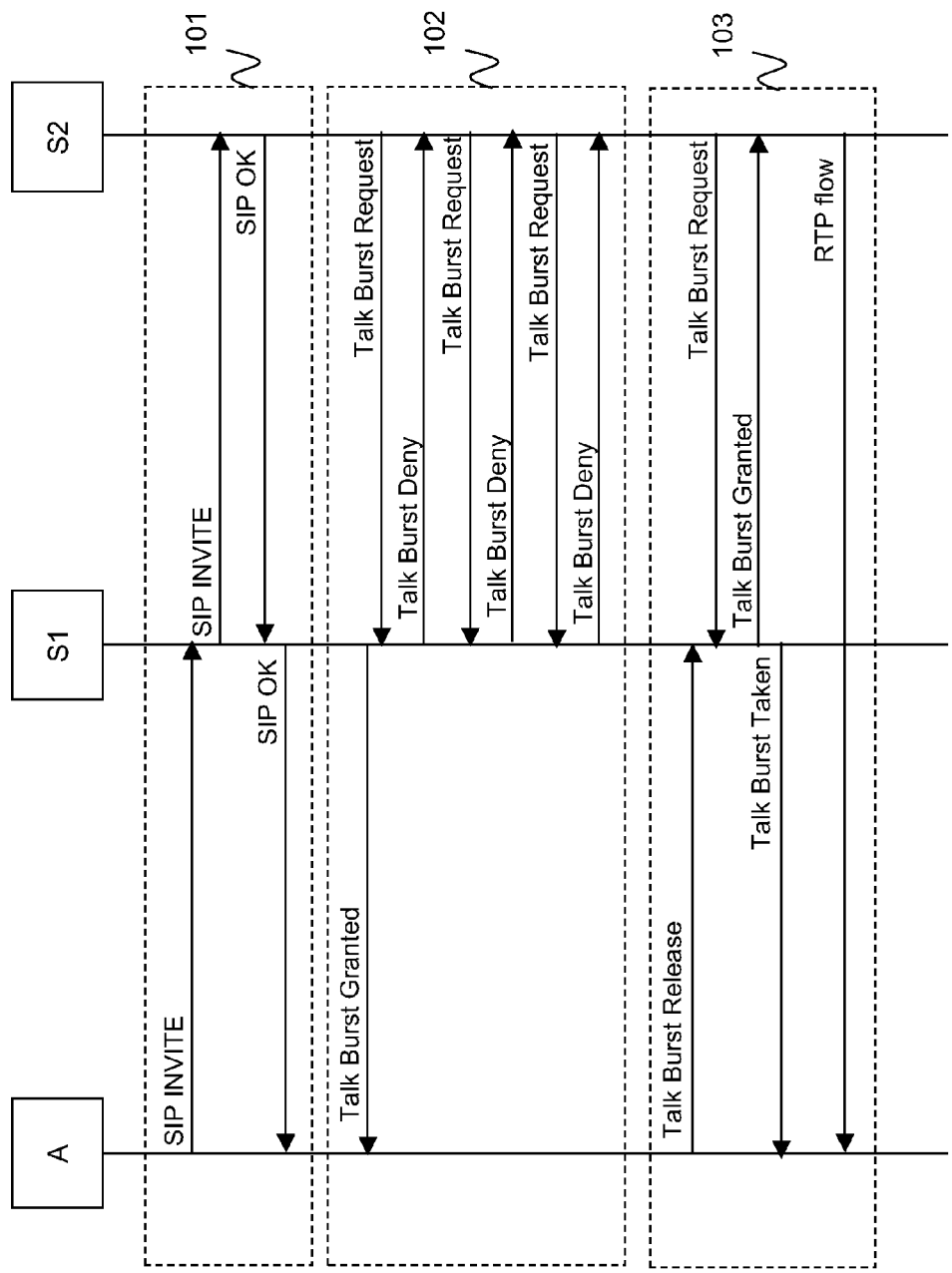
FIGS. 10a and 10b schematically show messages exchanged by a user terminal, a POC server and the content server of FIG. 3 in case of a service wherein a content is delivered in pull mode, according to a first and a second embodiment of the present invention, respectively.
Figure 10B:
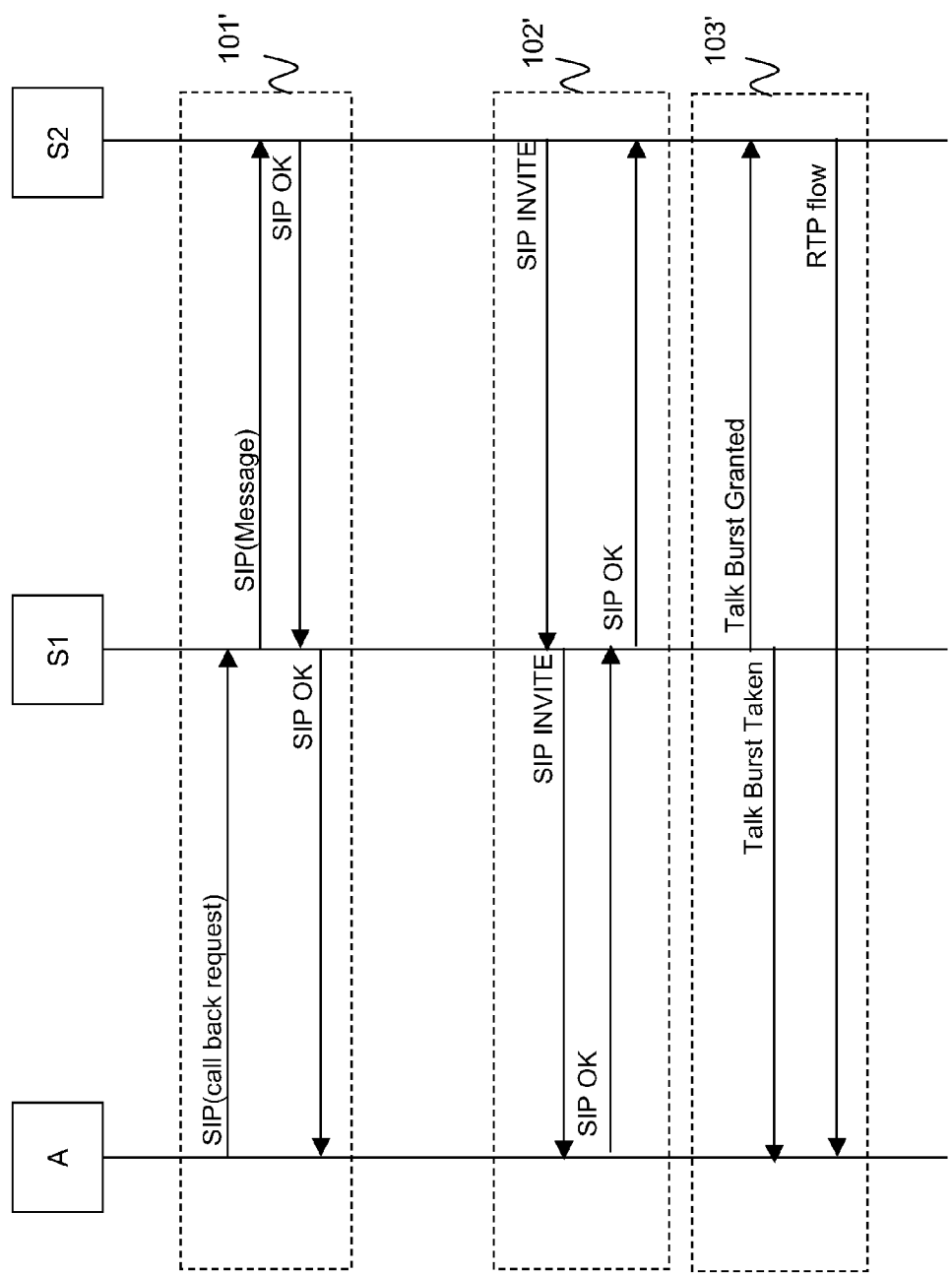

FIGS. 10a and 10b schematically show messages exchanged by a user terminal A, the POC server S1 and the content server S2 of FIG. 3 in case of a service S wherein a content is delivered in pull mode, according to a first and a second embodiments of the present invention, respectively. It is assumed that the POC server S1, the content server S2 and the actual users communicate through the SIP protocol. This is only exemplary, since other signaling protocols can be employed as well. Further, it is assumed that talk grants are negotiated between the POC server S1 and the users (both actual and virtual) through the above cited TBCP protocol.

By referring first to FIG. 10a, during a first step 101 the actual user of the terminal A requests a content by requesting the activation of a one-to-one POC session with the content virtual user corresponding to the requested content. More particularly, the actual user of the terminal A selects a content virtual user from the list of available users displayed on his terminal A. This results in a SIP INVITE message sent from terminal A to the POC server S1. The POC server S1 then forwards the SIP INVITE message to the server S2. The content virtual user associated to the requested content and residing on the server S2 "accepts" to participate to the one-to-one POC session, since the server S2 automatically sends a SIP OK message to the terminal A through the POC server S1.

During a second step 102, the talk grant is assigned to the terminal A by default, since the terminal A has requested the POC session activation. Indeed, according to the standard OMA POC, when a POC session is activated, the POC server automatically assigns the talk grant to the user who first requested the POC session activation by sending a Talk Burst Granted message to his terminal. Preferably, the server S2 may be configured so as to ignore possible voice and/or noise transmitted by the terminal A to the virtual user during the POC session, when talk grant is assigned to terminal A. Substantially at the same time, the server S2, acting as the content virtual user associated to the requested content, starts sending a sequence of Talk Burst Request messages to the POC server S1. However, since the talk grant is assigned to the terminal A, the server S1 refuses the talk grant by replying to each Talk Burst Request message received from the server S2 with a Talk Burst Deny message.

During a third step 103, the actual user of the terminal A releases the talk button of the terminal A, so that the talk grant is assigned to the content virtual user associated to the requested content. More particularly, when the actual user releases the talk button of its terminal A, the terminal A sends a Talk Burst Release message to the POC server S1. Therefore, when the POC server S1 receives a successive Talk Burst Request message from the server S2, it replies with a Talk Burst Granted message, thus assigning the talk grant to the content virtual user associated to the requested content. Then, the POC server S1 sends a Talk Burst Taken message to the terminal A, for informing it that the talk grant has been assigned to the virtual user associated to the requested content. Upon reception of the Talk Burst Granted message, the server S2 starts transmitting the requested content to the terminal A, for instance as an RTP flow.

Therefore, according to this first embodiment of FIG. 10a, the actual user requests a content by requesting a one-to-one POC session with the virtual user corresponding to the requested content. As soon as the POC session has been activated, the content is provided to the actual user. Therefore, according to this first embodiment, the delay perceived by an actual user between the transmission of a content request and the reception of the requested content is mainly due to activation of the POC session.

By referring now to FIG. 10b, during a first step 101', the actual user of the terminal A requests a content by requesting to the content virtual user associated to the requested content to activate a one-to-one POC session with the terminal A. More particularly, the actual user sends through his terminal A a SIP MESSAGE message corresponding to a call-back request or an instant personal alert to the POC server S1, which forwards such a message to the server S2.

Upon reception of the SIP MESSAGE message, the server S2 stores it in a request queue, which comprises all the SIP MESSAGE messages received from terminals of users wishing to receive a given content in pull mode, i.e. wishing to "talk" with the associated virtual user. In this way, the server S2 can allocate its resources to the different requests, in order to optimize the usage of its resources.

When the server S2 decides to serve the request of the terminal A, during a second step 102', the server S2 acts like the virtual user associated to the requested content by inviting the terminal A to participate to a one-to-one POC session. The invitation is performed by transmitting a SIP INVITE message to the terminal A through the POC server S1. In case the actual user of the terminal A accepts to participate to the POC session, the actual user sends by his terminal A a SIP OK message to the POC server S1, which forwards it to the server S2.

During a third step 103', the POC server S1 sends a Talk Burst Granted message to the virtual user associated to the requested content and residing on the server S2. Indeed, in this case, differently from the embodiment of FIG. 10*a*, the one-to-one POC session is not requested by the actual user, but from the content virtual user associated to the requested content. Therefore, the POC server S1 automatically assigns the talk grant to the content virtual user associated to the requested content. Upon reception of the Talk Burst Granted message, the server S2 sends the requested content to the actual user of the terminal A, for instance as an RTP flow.

Figure 11:
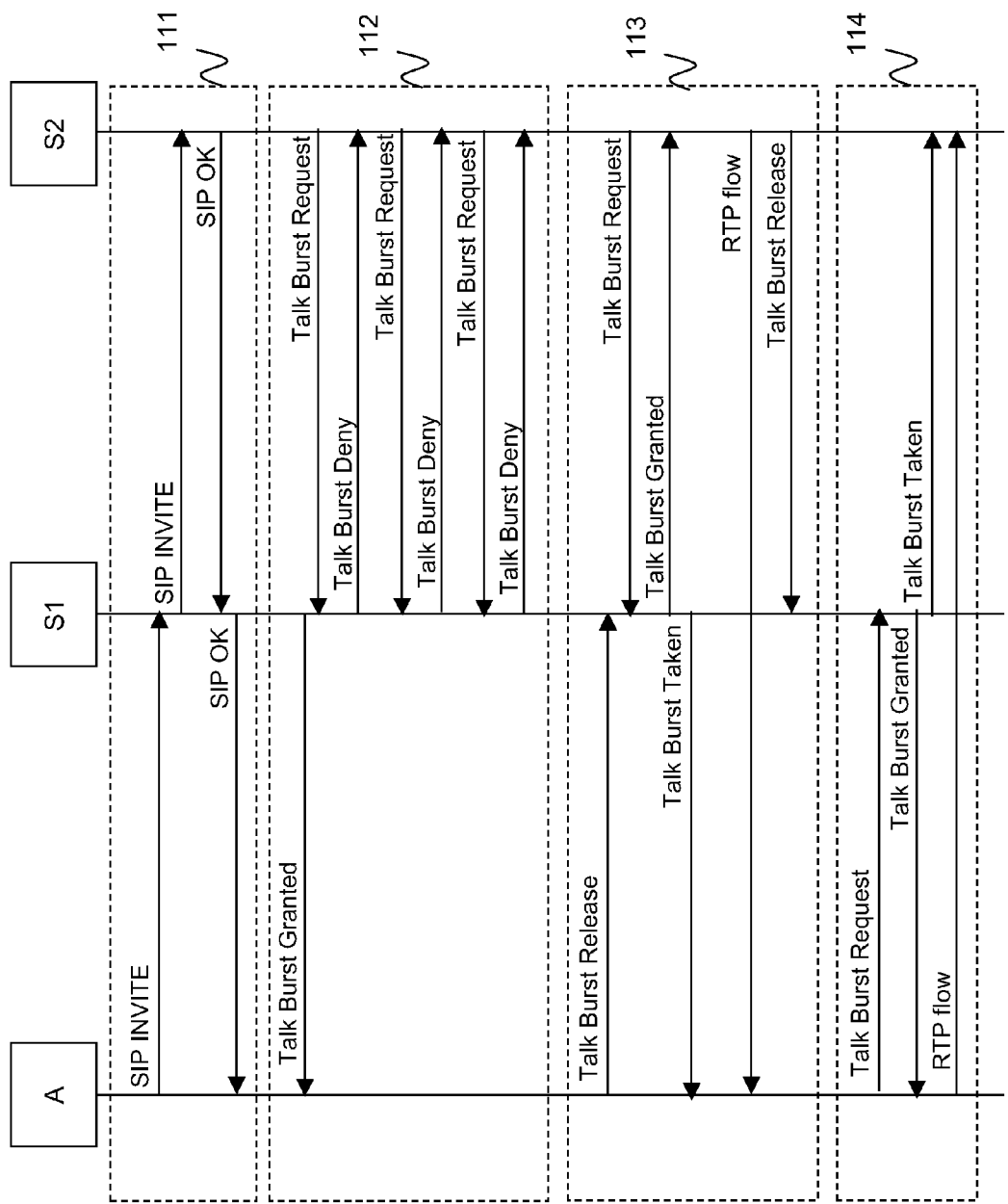
FIG. 11 schematically shows messages exchanged by a user terminal, a POC server and the content server of FIG. 3 in case of a service wherein a content is delivered in content providing mode, according an embodiment of the present invention.

FIG. 11 schematically shows messages delivered by a user terminal A, the POC server S1 and the content server S2 of FIG. 3 in case of a service S wherein a content is delivered in content providing mode, according to an embodiment of the present invention. It is assumed that the POC server S1, the content server S2 and the actual users communicate through the SIP protocol. This is only exemplary, since other signaling protocols can be employed as well. Further, it is assumed that talk grants are negotiated between the POC server S1 and the users (both actual and virtual) through the above cited TBCP protocol.

During a first step 111, the actual user of the terminal A requests to transmit a content to the server S2 by requesting to activate a one-to-one POC session with a basket virtual user associated with reception of the content he wishes to transmit. More particularly, the actual user selects the content from the list of available users displayed on his terminal A. This results in a SIP INVITE message sent from the terminal A to the POC server S1. The POC server S1 forwards this SIP INVITE message to the server S2. The basket virtual user "accepts" to participate to the one-to-one POC session, since the server S2 automatically sends a SIP OK message to the POC server S1, which forwards it to the terminal A.

During a second step 112, the POC server S1 firstly assigns the talk grant to the terminal A, since it has requested to activate the POC session, by sending a Talk Burst Request message to the terminal A. Substantially at the same time, the basket virtual user starts requesting the talk grant to the POC server S1. More particularly, the basket virtual user, which resides on the server S2, starts sending Talk Burst Request messages to the POC server S1. The POC server S1 refuses the talk grant to the server S2 by replying to each Talk Burst Request message with a Talk Burst Deny message.

During a third step 113, the actual user releases the talk button of the terminal A, so that the talk grant is assigned to the basket virtual user. More particularly, when the actual user releases the talk button of its terminal A, the terminal A sends a Talk Burst Release message to POC server S1. Therefore, when the POC server S1 receives a further Talk Burst Request message from the server S2, it replies with a Talk Burst Granted message. Further, the POC server S1 informs the terminal A that the talk grant has been assigned to the basket virtual user by sending it a Talk Burst Taken message. Upon reception of the Talk Burst Granted message, the server S2 may for instance transmit a courtesy announcement associated with the basket virtual user to the terminal A, for instance as an RTP flow. For instance, such a courtesy announcement may invite the actual user to push the talk button of his terminal before speaking. At the end of the courtesy announcement, the server S2 sends to the POC server S1 a Talk Burst Release message.

During a fourth step 114, the actual user pushes the talk button of the terminal A and speaks, so that the actual user can transmit his content. More particularly, when the actual user pushes the talk button of the terminal A, the terminal A sends a Talk Burst Request message to the POC server S1. The POC server S1 then sends a Talk Burst Granted to the terminal A. The actual user then speaks, so that the content of his speech is transmitted to the server S2, for instance as an RTP flow.

The content provided by the actual user is stored in the memory UPCM of the server S2 and possibly checked for reliability and/or correctness. Then, in case of a successful result of the check, the content is loaded in the module CLo of the server S2, which associates the content provided by the actual user to a proper content virtual user identifier, so that this content may be provided to other actual users, either in push mode or in pull mode.

Even if the above description is referred to a mobile telephone network supporting POC as defined by OMA, the present invention also applies to any communication network supporting communication through push-to-talk.

The invention claimed is:

1. A method of providing a content delivery service to an actual user of a communication system supporting push-to-talk, said content delivery service comprising delivering a content to said actual user, comprising:
    receiving a subscription to said content delivery service from said actual user, the service being capable of delivering a set of content to said actual user in a push-to-talk session according to a plurality of exchange modes, the different modes including push mode and pull mode;
    storing said content among said set of content available for delivery to said actual user using said plurality of exchange modes;
    associating a different virtual user to each of said set of content in a biunique relationship, said virtual user being selected from a set of possible virtual users comprising a push content virtual user and a pull content virtual user in accordance with the subscription;
    associating one of the plurality of exchange modes to each of said set of content;
    providing identifiers of each of the set of content available for delivery in pull mode to said actual user for display and selection;
    receiving an indication to deliver said content to said actual user;
    determining the mode for delivery of said content to said actual user based on the exchange mode associated with said content;
    establishing a push-to-talk session between said actual user and said virtual user;
    and
    delivering said content between said virtual user and said actual user through the established push-to-talk session using the determined mode in accordance with the subscription.

2. The method according to claim 1, wherein said associating said virtual user to said content is performed responsive to said content first becoming available and being stored.

3. The method according to claim 1, wherein said establishing a push-to-talk session comprises establishing a one-to-many push-to-talk session involving said virtual user and a plurality of actual users of said communication system, the plurality of actual users comprising said actual user.

4. The method according to claim 1, wherein requesting establishment of said push-to-talk session is performed by said actual user.

5. The method according to claim 4, wherein said establishing a push-to-talk session comprises establishing a one-to-one push-to-talk session between said actual user and said virtual user.

6. The method according to claim 1, wherein said content is provided by a content provider.

7. The method according to claim 1, wherein said content is provided by a further actual user.

8. The method according to claim 7, wherein said content is provided through an established further push-to-talk session involving said further actual user and a further virtual user.

9. A network apparatus for providing a content delivery service to an actual user of a communication system supporting push-to-talk, said content delivery service comprising delivering a content from said network apparatus to a terminal of said actual user, comprising:
an actual users database storing a list of actual users which have made a subscription to the content delivery service, the service being capable of delivering a set of content to said actual user in a push-to-talk session according to a plurality of exchange modes, the different modes including push mode and pull mode;
a content memory for storing said content among said set of content available for delivery to said actual user using said plurality of exchange modes;
a content loader module being configured for associating a different virtual user to each of said set of content in a biunique relationship, said virtual user being selected from a set of possible virtual users comprising a push content virtual user and a pull content virtual user in accordance with the subscription by the actual user;
a database associating one of the plurality of exchange modes to each of said set of content;
an extended group management module being configured for creating at least one extended group associated with said content providing service, for providing said push-to-talk server of said communication system with an identifier of said at least one extended group, wherein said at least one extended group comprises said actual user and said virtual user, and for providing identifiers of each of the set of content available for delivery in pull mode for sending to said actual user for display and selection;
a module receiving an indication to deliver said content to said actual user;
a content delivery module determining the mode for delivery of said content to said actual user based on the exchange mode associated with said content;
a talk grant negotiation module configured for sending a talk request message to a push-to-talk server and for receiving a talk grant message or a talk deny message from said push-to-talk server for one of the actual user and the virtual user;
a service management module being configured for requesting establishing of a push-to-talk session between said actual user and said virtual user; and
a transmitting module being configured for delivering said content from said virtual user to said actual user using the determined mode in accordance with the subscription by the actual user.

10. The apparatus according to claim 9, further comprising a database storing a list of content virtual user identifiers of contents relating to said content delivery service.

11. The apparatus according to claim 9, wherein said database is further storing information for enabling appropriate association of a content virtual user identifier of said list to said content.

12. The apparatus according to claim 9, wherein said content loader module is further being configured for checking availability of said content in said content memory and, upon availability of said content in said content memory, for loading said content in said database.

13. The apparatus according to claim 9, further comprising a user invitation transmission module being configured for transmitting an invite message to said actual user for inviting said actual user to join a session of said content providing service.

14. The apparatus according to claim 10, further comprising a push module being configured for:
checking for possible new content in said database; and
upon detection of a new content in said database, requesting said transmitting module to transmit said new content to a plurality of actual users comprising said actual user.

15. The apparatus according to claim 10, further comprising a pull module being configured for:
upon reception of a request for content from an actual user, requesting said talk grant negotiation module to request a talk grant; and
upon reception of said talk grant, requesting said transmitting module to transmit said content to said actual user.

16. A communication system supporting push-to-talk, comprising:
a push-to-talk server;
an actual users database storing a list of actual users which have made a subscription to the content delivery service, the service being capable of delivering a set of content to said actual user in a push-to-talk session according to a plurality of exchange modes, the different modes including push mode and pull mode;
a content memory for storing said content among said set of content available for delivery to said actual user using said plurality of exchange modes;
a content loader module being configured for associating a different virtual user to each of said set of content in a biunique relationship, said virtual user being selected from a set of possible virtual users comprising a push content virtual user and a pull content virtual user in accordance with the subscription by the actual user;
a database associating one of the plurality of exchange modes to each of said set of content;
an extended group management module being configured for creating at least one extended group associated with said content providing service, for providing said push-to-talk server of said communication system with an identifier of said at least one extended group, wherein said at least one extended group comprises said actual user and said virtual user, and for providing identifiers of each of the set of content available for delivery in pull mode for sending to said actual user for display and selection;
a module receiving an indication to deliver said content to said actual user;
a content delivery module determining the mode for delivery of said content to said actual user based on the exchange mode associated with said content;

a talk grant negotiation module configured for sending a talk request message to said push-to-talk server and for receiving a talk grant message or a talk deny message from said push-to-talk server for one of the actual user and the virtual user;

a service management module being configured for requesting establishing of a push-to-talk session between said actual user and said virtual user; and a transmitting module being configured for delivering said content from said virtual user to said actual user using the determined mode in accordance with the subscription by the actual user.

17. The communication system according to claim 16, further comprising a terminal of an actual user, said terminal being in communication with said network apparatus and with said push-to-talk server.

\* \* \* \* \*